US 7,934,264 B2

(12) United States Patent
Basson et al.

(10) Patent No.: US 7,934,264 B2
(45) Date of Patent: Apr. 26, 2011

(54) METHODS, SYSTEMS, AND COMPUTER PROGRAM PRODUCTS FOR DETECTING ALTERATION OF AUDIO OR IMAGE DATA

(75) Inventors: Sara H. Basson, White Plains, NY (US); Sarah L. Conrod, Sydney (CA); Dimitri Kanevsky, Ossining, NY (US); Edward E. Kelley, Wappingers Falls, NY (US); Giridharan R. Iyengar, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 11/829,338

(22) Filed: Jul. 27, 2007

(65) Prior Publication Data

US 2009/0031425 A1 Jan. 29, 2009

(51) Int. Cl.
| | |
|---|---|
| G06F 11/00 | (2006.01) |
| G06F 12/14 | (2006.01) |
| G06F 12/16 | (2006.01) |
| G06F 7/04 | (2006.01) |
| G06F 17/30 | (2006.01) |
| G08B 23/00 | (2006.01) |
| H04N 7/16 | (2011.01) |
| G06F 15/16 | (2006.01) |

(52) U.S. Cl. ............... 726/26; 726/24; 726/25; 709/217
(58) Field of Classification Search .................. None
See application file for complete search history.

(56) References Cited

U.S. PATENT DOCUMENTS

| | | | |
|---|---|---|---|
| 6,973,573 B1 | 12/2005 | Carson et al. | |
| 7,065,746 B2 * | 6/2006 | Szabo et al. | 717/121 |
| 2004/0174835 A1 | 9/2004 | Godwin et al. | |
| 2004/0236951 A1 | 11/2004 | Zhao | |
| 2006/0218135 A1 * | 9/2006 | Bisson et al. | 707/4 |
| 2006/0253207 A1 | 11/2006 | Jaffray et al. | |
| 2007/0162927 A1 * | 7/2007 | Ramaswamy et al. | 725/36 |
| 2007/0180530 A1 * | 8/2007 | Verma et al. | 726/24 |
| 2008/0275960 A1 * | 11/2008 | Myllyla et al. | 709/217 |
| 2009/0063159 A1 * | 3/2009 | Crockett | 704/500 |

OTHER PUBLICATIONS

Digital video watermarking for metadata embedding in UAV video, Marcinak, M.P.; Mobasseri, B.G.; Military Communications Conference, 2005. MILCOM 2005. IEEE, Oct. 17-20, 2005 p. 1-5:1637 vol. 3.

Audio watermarking: A way to stationnarize audio signals Larbi, Sonia Djaziri; Jaidane-Saidane, Meriem, IEEE Transactions on Signal Processing, v 53, n 2 II, Feb. 2005, p. 816-823.

(Continued)

*Primary Examiner* — Shin-Hon Chen
(74) *Attorney, Agent, or Firm* — Cantor Colburn LLP (57) ABSTRACT

Using metadata to detect alteration of data. A first set of metadata characteristics including at least one respective semantic description are recorded for a first set of data representing original data. A second set of metadata characteristics including at least one corresponding semantic description are recorded for a second set of data representing data under test. The first and second sets of metadata characteristics are compared. If the first and second sets of metadata characteristics are not identical, these sets are processed to identify locations in the first set of data that have been altered. Using the at least one semantic description for the first set of data and the at least one corresponding semantic description for the second set of data, one or more metadata characteristics that have changed from the first set of data to the second set of data are identified.

21 Claims, 4 Drawing Sheets

OTHER PUBLICATIONS

On the comparison of audio fingerprints for extracting quality parameters of compressed audio Doets, P.J.O.; Gisbert, M. Menor; Lagendijk, R.L., Proceedings of SPIE—The International Society for Optical Engineering, v 6072, Security, Steganography, and Watermarking of Multimedia Contents VIII—Proceedings of SPIE-IS and T Electronic Imaging, 2006, p. 60720L.

A comparison of schemas for video metadata representation Jane Hunter, and Liz Armstrong Computer Networks, v 31, n 11-16, May 17, 1999, 1431-51.

* cited by examiner

METHODS, SYSTEMS, AND COMPUTER PROGRAM PRODUCTS FOR DETECTING ALTERATION OF AUDIO OR IMAGE DATA

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to data authentication and, more particularly, to techniques for detecting alteration of audio data, image data, or both.

2. Description of Background

Audio and image data may be stored to create records of court proceedings, to document conversations held during business meetings, and to archive information that is broadcast via television or radio. In many situations, data tampering leads to risks in safety and security. For example, many court cases rely upon audio evidence to convict or exonerate a suspect, thereby creating a perilous situation if a guilty party is set free as a result of data that is deliberately altered. Likewise, radio and television stations often broadcast archived data. If erroneous information is broadcast in relation to an impending terrorist attack or natural disaster, panic may ensue. In the case of image data, identifying the source of an image or photograph is difficult if the image has been modified or enhanced. For example, an image taken from a computer and brightened using a photo editing program may appear different from the original when, in fact, it is a copy of the original photo. This technique is often utilized by distributors of pornography who avoid being linked to their merchandise by modifying images before the images are distributed.

Existing methods for detecting alterations to audio and image data involve analyzing a unique digital fingerprint of the actual data. Each audio sample or visual image is encoded with a known "fingerprint" or digital signature that will change if the original data is modified. However, if the data in question is stored in analog form, it is not possible to use the digital signature to detect data alteration or tampering. When digital data is converted into analog data, all digital signatures are lost along with the security features provided by these signatures. Moreover, in many cases, digital signatures can be manually modified with existing technology, such that two different sets of data are made to appear identical based upon their digital signatures, thereby reducing the effectiveness of the digital signature approach for detecting data alterations. In view of the foregoing considerations, what is needed is an improved method for detecting alterations to audio or image data.

SUMMARY OF THE INVENTION

The shortcomings of the prior art are overcome and additional advantages are provided by using metadata to detect alteration of audio data, image data, or both. A first set of metadata characteristics are recorded for a first set of data representing original data. A second set of metadata characteristics are recorded for a second set of data representing data under test. The first set of metadata characteristics includes at least one respective semantic description for the first set of data, and the second set of metadata characteristics includes at least one corresponding semantic description for the second set of data. The first and second sets of metadata characteristics are compared. If the first and second sets of metadata characteristics are not identical, then the second set of data is identified as an altered version of the first set of data. The first and second sets of metadata characteristics are processed to identify one or more locations in the first set of data that have been altered. Using the at least one semantic description for the first set of data and the at least one corresponding semantic description for the second set of data, one or more metadata characteristics that have changed from the first set of data to the second set of data are identified.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
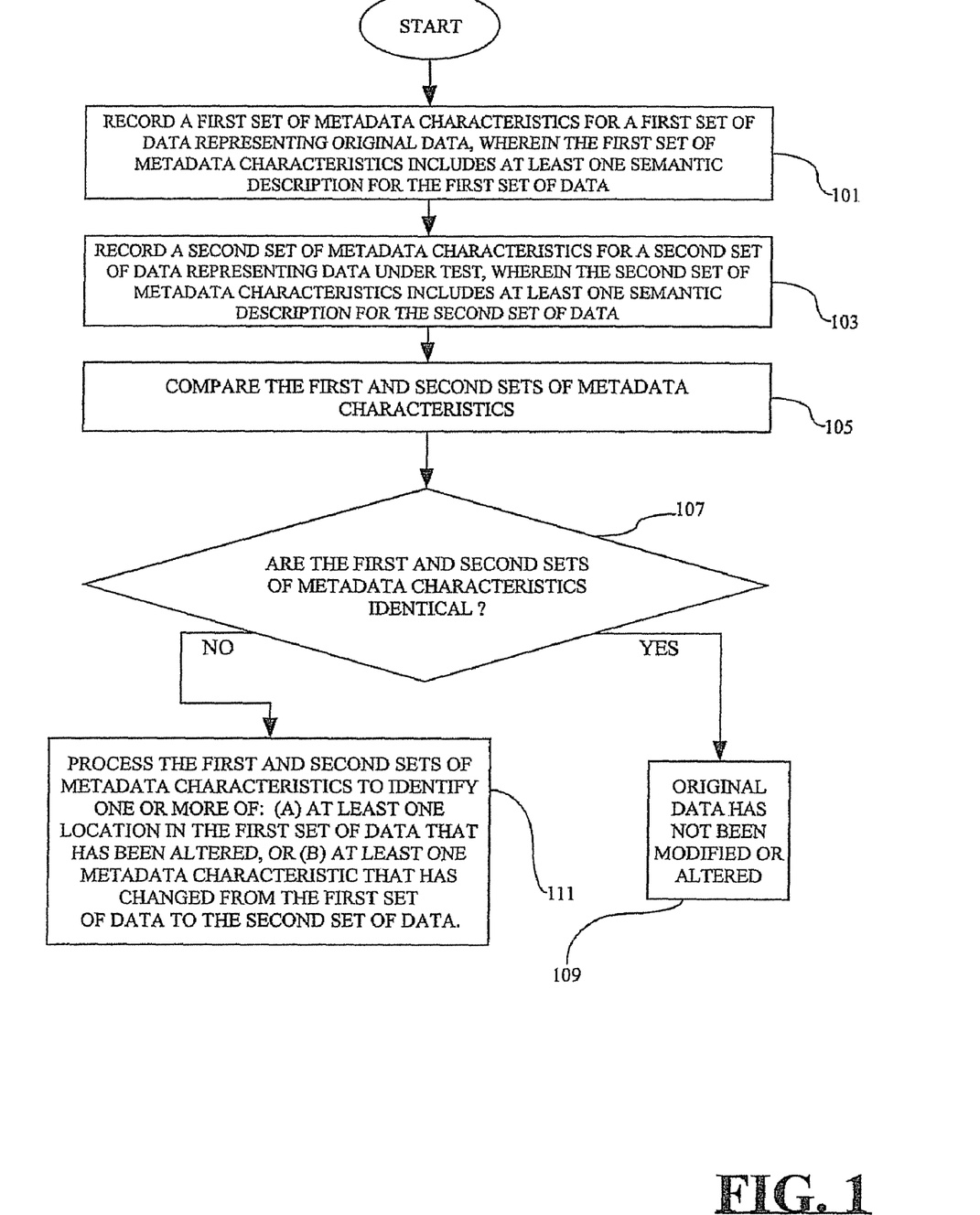
FIG. 1 is a flowchart of an exemplary procedure for using metadata to detect alteration of audio data, image data, or both.

FIG. 1 is a flowchart of an exemplary procedure for using metadata to detect alteration of audio or image data. The procedure commences at block 101 where a first set of metadata characteristics are recorded for a first set of data representing original data. Audio and image data can be analyzed and archived using any of a multiplicity of different types of metadata. The first set of metadata characteristics includes at least one semantic description for the first set of data. To illustrate, if the first set of data is audio data, then the semantic description may, but need not, include information descriptive of the nature of the audio, such as descriptions of voices involved in a conversation (emotion, pitch, volume, frequency), or descriptions of any background noises in the audio (volume, pitch, frequency, duration). This metadata could, but need not, be gathered using speech recognition software. In the case of image data, metadata could, but need not, be created using object recognition software to provide semantic descriptions of an image or full motion video. Additionally or alternatively, metadata for image data may include semantic descriptions of color schemes, brightness, contrast, hue, or pixellation.

Speech recognition of an audio sample will generate a unique printed or written transcript that serves as a fingerprint of an audio file. If, for example, an audio sample is to be used in a criminal court case, the sample will have been archived before it is submitted to the court. The sample illustratively represents an analog recording, a digitized recording, a digitized sample of an analog recording, or a digitized sample of an analog recording that is played back in analog form. The archive contains metadata of the audio such as transcripted text, descriptions of voices, and descriptions of background noises. Since speech recognition typically proceeds with imperfect precision, a transcript of the sample may contain some unique irregularities. A human speaker creating the audio sample may state "the dog sits", whereas a speech recognition system may transcribe "the rock sits". Although the transcript may not be correct, a unique fingerprint of the audio file is created since the speech recognition system will make the same error every time the audio file is transcribed. This fingerprint represents a constant, unchangeable set of unique characteristics corresponding to the original data.

Next, at block 103, a second set of metadata characteristics are recorded for a second set of data representing data under test. The second set of metadata characteristics contains at least one semantic description for the second set of data that corresponds to a semantic description for the first set of data. For example, assume that the first set of data comprises image data. A semantic description for the first set of data is recorded in the form of the brightness of the image as described on a numerical scale of relative brightness. Accordingly, a corresponding semantic description for the second set of data is brightness of the image represented by the second set of data as described on a numerical scale of relative brightness.

The first and second sets of metadata characteristics are compared (block 105) to determine whether or not any tampering has taken place with respect to the data under test. A test is performed at block 107 to ascertain whether or not the first and second sets of metadata characteristics are identical. If the first and second sets of metadata characteristics are identical, then the original data has not been modified or altered (block 109). Optionally, the test at block 107 includes determining, estimating, or approximating a degree of similarity between the first and second sets of data. This optional test may be performed, for example, to address the problem of modifying images to avoid prosecution in the pornography industry.

The negative branch from block 107 leads to block 111 where the first and second sets of metadata characteristics are processed to identify one or more of: (A) at least one location in the first set of data that has been altered, or (B) one or more metadata characteristics that have changed from the first set of data to the second set of data. Identification of one or more metadata characteristics that have changed from the first set of data to the second set of data may be performed by using the at least one semantic description for the first set of data and the at least one corresponding semantic description for the second set of data.

Figure 2:
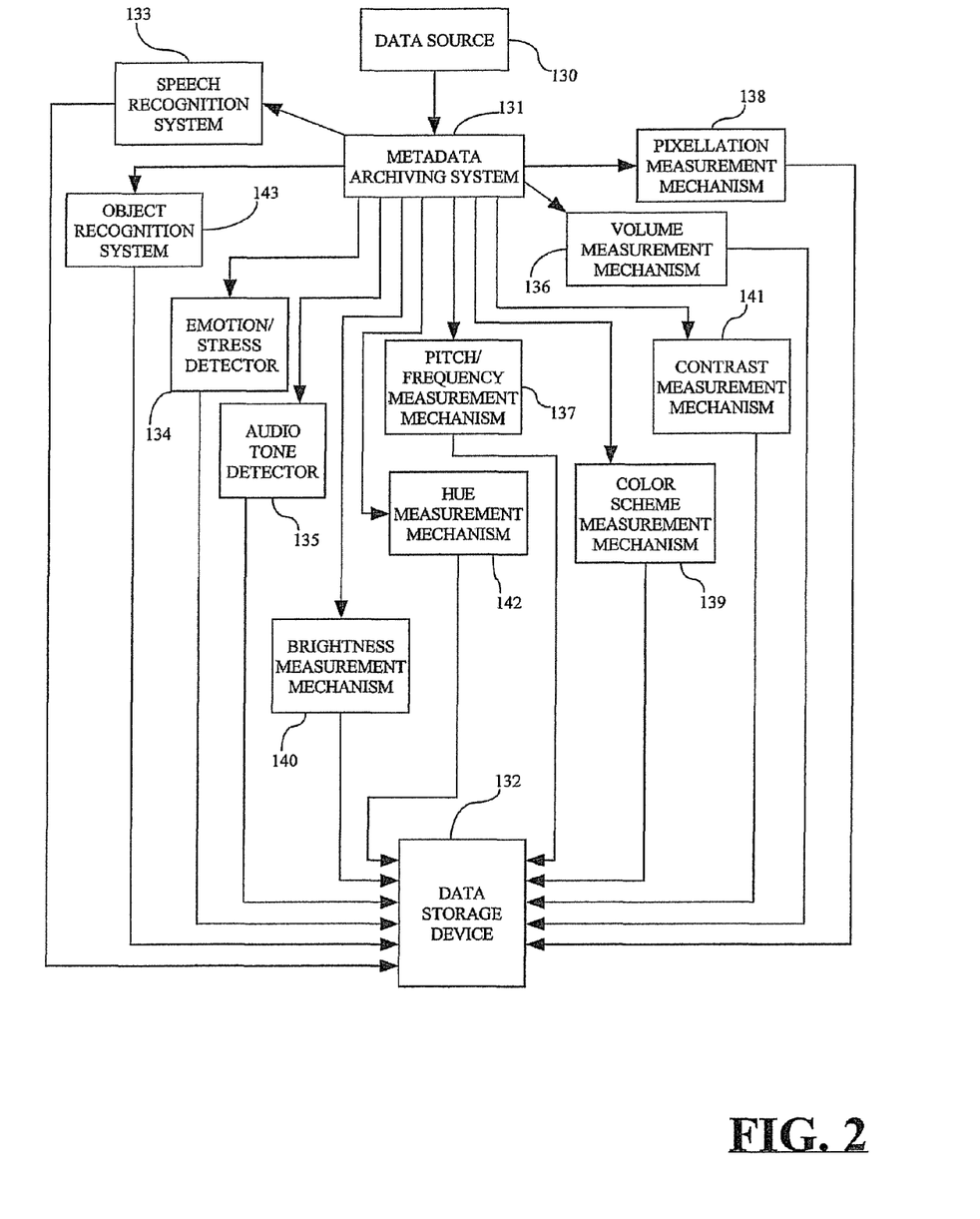
FIG. 2 is a simplified block diagram of a first exemplary system for using metadata to detect alteration of audio data, image data, or both.

FIG. 2 is a simplified block diagram of a first exemplary system for using metadata to detect alteration of audio or image data. A data source 130 is capable of reproducing or generating audio data, image data, or audio data and image data. Data source 130 is operatively coupled to a metadata archiving system 131 for archiving metadata corresponding to at least one of audio or image data. Metadata archiving system 131 includes one or more characteristic determining mechanisms such as a speech recognition system 133, an emotion/stress detector 134, an audio tone detector 135, a volume measurement mechanism 136, a frequency/pitch measurement mechanism 137, a pixellation measurement mechanism 138, a color scheme measurement mechanism 139, a brightness measurement mechanism 140, a contrast measurement mechanism 141, and hue measurement mechanism 142, and an object recognition system 143.

The one or more characteristic determining mechanisms are operatively coupled to a data storage drive 132 capable of storing one or more unique metadata fingerprints corresponding to audio or image data generated or reproduced by data source 130, and processed by the one or more characteristic determining mechanisms. These one or more characteristic determining mechanisms create a unique metadata fingerprint for data obtained from data source 130.

Figure 3:
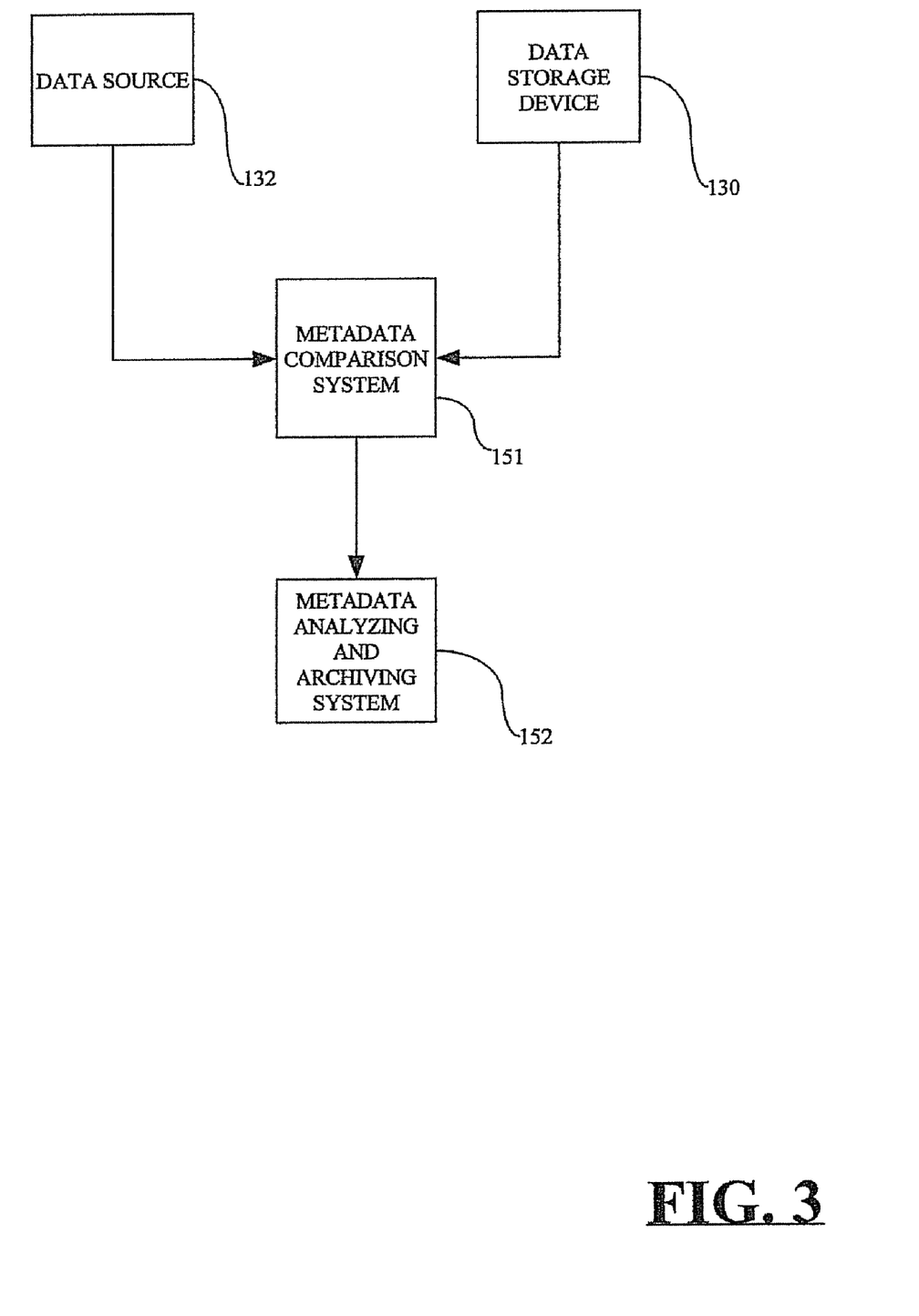
FIG. 3 is a simplified block diagram of a second exemplary system for using metadata to detect alteration of audio data, image data, or both.

FIG. 3 is a simplified block diagram of a second exemplary system for using metadata to detect alteration of audio or image data. Data source 130 (FIGS. 2 and 3) is capable of reproducing or generating audio data, image data, or audio data and image data. In the example of FIG. 3, data source 130 is used to play back or reproduce a set of data representing data under test. Data storage device 132 (FIGS. 2 and 3) is capable of storing one or more unique metadata fingerprints corresponding to audio or image data generated or reproduced from a first set of data representing original data. These metadata fingerprints represent a set of metadata characteristics associated with the original data, and for explanatory purposes may be referred to as a first set of metadata characteristics. Accordingly, the set of data representing data under test will be referred to as a second set of data having a second set of metadata characteristics associated therewith.

Data source 130 (FIG. 3) and data storage device 132 are operatively coupled to a metadata comparison system 151 capable of ascertaining whether or not the first and second sets of metadata characteristics are identical. If the first and second sets of metadata characteristics are identical, then the original data has not been modified or altered. Optionally, metadata comparison system 151 is capable of determining, estimating, or approximating a degree of similarity between the first and second sets of data. This optional test may be performed, for example, to address the problem of modifying images to avoid prosecution in the pornography industry.

Metadata comparison system 151 is operatively coupled to a metadata analyzing and archiving system 152. Metadata analyzing and archiving system 152 is capable of processing the first and second sets of metadata characteristics to identify one or more locations in the first set of data that have been altered. Using the at least one semantic description for the first set of data and the at least one corresponding semantic description for the second set of data, one or more metadata characteristics that have changed from the first set of data to the second set of data are identified. Metadata comparison system 151 and metadata analyzing and archiving system 152 may each be implemented using a separate processor or computer, or a single hardware element may be used to implement metadata comparison system 151 and metadata analyzing and archiving system 152.

Figure 4:
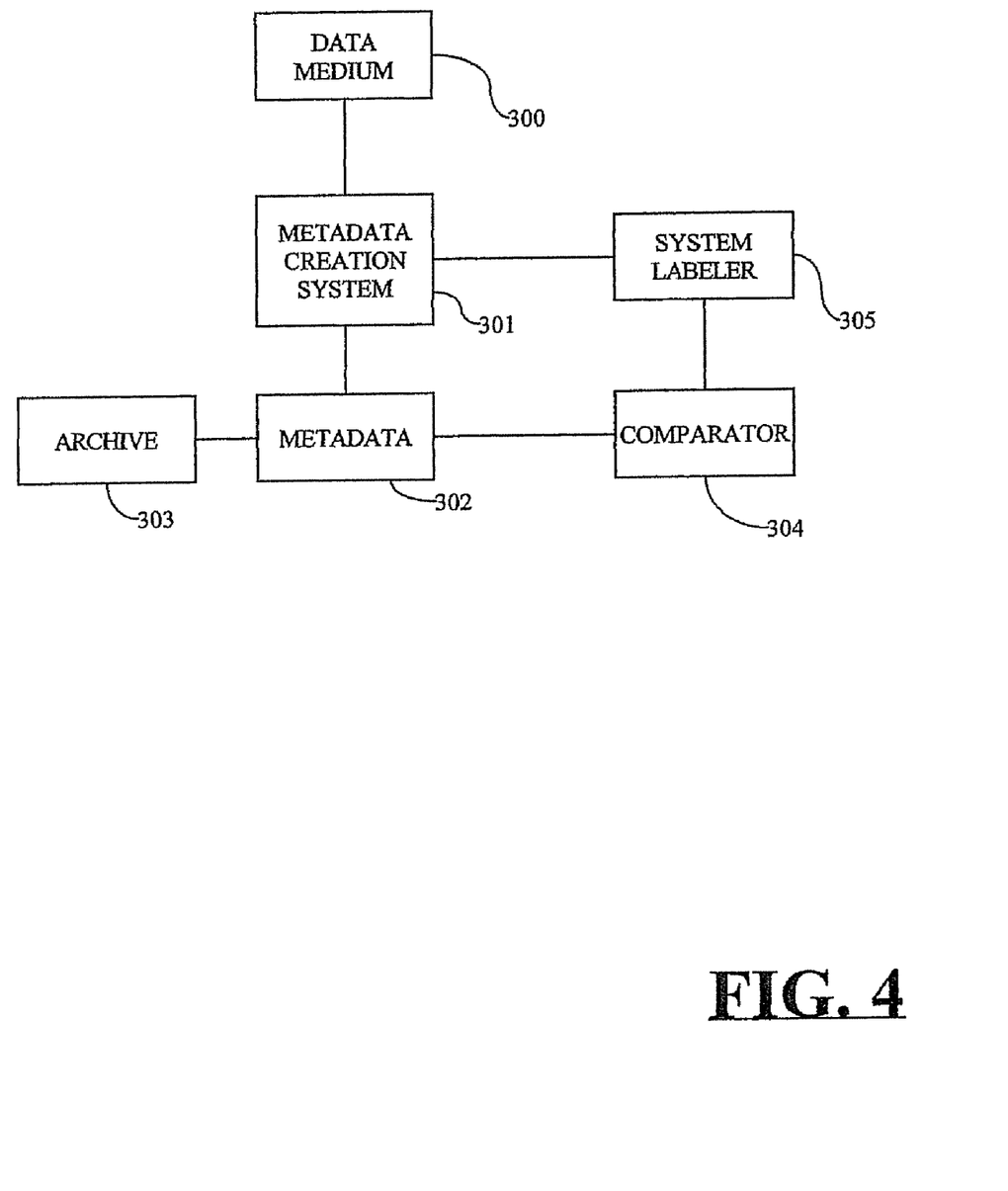
FIG. 4 is a simplified block diagram of a third exemplary system for using metadata to detect alteration of audio data, image data, or both.

FIG. 4 is a simplified block diagram of a third exemplary system for using metadata to detect alteration of audio or image data. A data medium 300 provides one or more data inputs to a metadata creation system 301 capable of creating metadata from the one or more data inputs. Data medium 300 may provide data inputs representing analog audio, analog video, digital audio, digital video, an analog still image, or a digital still image, or any of various combinations thereof. Metadata creation system 301 is implemented using at least one of a speech recognition mechanism, an image recognition mechanism, a biometrics recognition mechanism, or any of various combinations thereof. The speech recognition mechanism is implemented by executing speech recognition software on a computer processor. The image recognition mechanism is implemented by executing image recognition software on a computer processor. The biometrics recognition software is implemented by executing biometrics software on a computer processor.

Metadata creation system 301 is operatively coupled to a system labeler 305. System labeler 305 labels or indexes each of a plurality of respective data inputs from data medium 300 with a label indicative of a mechanism used by metadata creation system 301 for creating metadata 302 from the corresponding data input. For example, a first data input representing a first data set may be indexed to indicate that metadata creation system 301 used a speech recognition mechanism to create metadata 302. Optionally, the first data set may be further indexed to indicate a version of speech recognition software used to create metadata 302.

Archive 303 is a data storage drive capable of storing information received from system labeler 305. Archive 303 is also capable of storing metadata 302 created by metadata creation system 301. If metadata 302 stored in archive 303 is subsequently requested from archive 303 for verification purposes, the stored metadata is retrieved and fed to a comparator 304 for processing. Comparator 304 receives metadata generated by metadata creation system 301. More specifically, metadata is received by comparator 304 in response to metadata creation system 301 generating metadata from a data set comprising archived data under test. The metadata 302 is generated by metadata creation system 301 using a mechanism as specified by the metadata stored in archive 303. This mechanism is specified by a label generated using system labeler 305.

Comparator 304 determines whether or not the label generated by system labeler 305 for the archived data under test is identical to the label included in the metadata stored in archive 303. Comparator 304 uses the foregoing label matching test to determine whether or not any data in the archived data under test have been altered. If any data have been altered, comparator 304 determines whether or not a semantic description of the archived data (i.e., the meaning of the archived data) has changed. Since metadata creation system 301 is used to create metadata that is semantically meaningful (i.e., descriptive of a set of data), the metadata can be used to detect data tampering. In the system of FIG. 4, decoded transcription errors are considered to be metadata. Other examples of metadata include emotions or stress levels of people, as well as descriptions of images of crime scenes that have semantic meanings for lawyers, judges, policemen, or investigators. Accordingly, it is possible to state that, because of the detected tampering, the meaning and interpretation of the content of a data set has changed from meaning "A" to meaning "B". This provides much more detailed information than simply concluding that the content of the data set was altered. Accordingly, using the system of FIG. 4, it is possible to identify altered data, and also to identify specific locations of data that were altered.

If metadata have been altered, it is possible to determine whether or not the altered metadata changes an overall meaning of a message defined by the data, wherein meaning "A" illustratively corresponds to "yes" or "guilty", and meaning "B" illustratively corresponds to "no" or "not guilty". If the overall meaning of the message has changed, then an alert may be issued indicative of a possible criminal intent in changing the message. For example, if the first set of data includes an audiovisual presentation of a criminal strangling a victim, and the data is altered by increasing the amplitude of the audio track accompanying the presentation, the overall meaning of the message would not be changed. However, if the data is altered to delete the face of the criminal, the overall meaning of the message has changed, possibly indicative of a criminal intent on the part of the individual altering the data.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for using metadata to detect alteration of audio data, image data, or both, the method comprising:

recording a first set of metadata characteristics for a first set of data representing original data, the first set of metadata characteristics including at least one respective semantic description for the first set of data;

recording a second set of metadata characteristics for a second set of data representing data under test, the second set of metadata characteristics including at least one corresponding semantic description for the second set of data;

comparing the first and second sets of metadata characteristics wherein, in the event the first and second sets of metadata characteristics are not identical, then the second set of data is identified as an altered version of the first set of data, and performing the comparing by comparing the first and second sets of metadata characteristics to identify one or more of: at least one location in the first set of data that have been altered, or at least one metadata characteristic that has changed from the first set of data to the second set of data, wherein the at least one metadata characteristic that has changed is identified using the at least one semantic description for the first set of data and the at least one corresponding semantic description for the second set of data; and at least one metadata characteristic that has changed from the first set of data to the second set of data is identified using the at least one semantic description for the first set of data and the at least one corresponding semantic description for the second set of data, the method further comprising using the identified at least one metadata characteristic to define a change of semantic meaning between the first set of data and the second set of data, determining whether or not the defined change of semantic meaning changes an overall meaning of a message defined by the first set of data and, if so, generating an alert indicative of a possible criminal intent in altering the message corresponding to the first set of data.

2. The method of claim 1 wherein recording a first set of metadata characteristics and recording a second set of metadata characteristics are performed using at least one of speech recognition, image recognition, or biometrics recognition.

3. The method of claim 1 wherein the first set of data represents audio data and the semantic description for the first set of data comprises one or more of: (a) a description of a voice involved in a conversation in terms of emotion, pitch, volume, frequency, or any of various combinations thereof; or (b) a description of any background noise in terms of volume, pitch, frequency, duration, or any of various combinations thereof.

4. The method of claim 1 wherein the first set of data represents image data and the semantic description for the first set of data comprises a description of a color scheme, a brightness level, a contrast level, a hue level, an amount of pixellation, or any of various combinations thereof.

5. The method of claim 1 further comprising labeling the first set of data with a label indicative of whether or not the first set of metadata was recorded using speech recognition.

6. The method of claim 1 further comprising labeling the first set of data with a label indicative of whether or not the first set of metadata was recorded using image recognition.

7. The method of claim 1 further comprising labeling the first set of data with a label indicative of whether or not the first set of metadata was recorded using biometrics recognition.

8. A non-transitory computer readable storage medium containing computer program code that, when executed by a computer, performs a method for using metadata to detect alteration of audio data, image data, or both, the method comprising:
recording a first set of metadata characteristics for a first set of data representing original data, the first set of metadata characteristics including at least one respective semantic description for the first set of data;
recording a second set of metadata characteristics for a second set of data representing data under test, the second set of metadata characteristics including at least one corresponding semantic description for the second set of data;
comparing the first and second sets of metadata characteristics wherein, in the event the first and second sets of metadata characteristics are not identical, then the second set of data is identified as an altered version of the first set of data, and performing the comparing by comparing the first and second sets of metadata characteristics to identify one or more of: at least one location in the first set of data that have been altered, or at least one metadata characteristic that has changed from the first set of data to the second set of data using the at least one semantic description for the first set of data and the at least one corresponding semantic description for the second set of data;
at least one metadata characteristic that has changed from the first set of data to the second set of data is identified using the at least one semantic description for the first set of data and the at least one corresponding semantic description for the second set of data, the method further comprising using the identified at least one metadata characteristic to define a change of semantic meaning between the first set of data and the second set of data, determining whether or not the defined change of semantic meaning changes an overall meaning of a message defined by the first set of data and if so generating an alert indicative of a possible criminal intent in altering the message corresponding to the first set of data.

9. The storage medium of claim 8 further including instructions for recording a first set of metadata characteristics and recording a second set of metadata characteristics using at least one of speech recognition, image recognition, or biometrics recognition.

10. The storage medium of claim 8 wherein the first set of data represents audio data and the semantic description for the first set of data comprises one or more of: (a) a description of a voice involved in a conversation in terms of emotion, pitch, volume, frequency, or any of various combinations thereof; or (b) a description of any background noise in terms of volume, pitch, frequency, duration, or any of various combinations thereof.

11. The storage medium of claim 8 wherein the first set of data represents image data and the semantic description for the first set of data comprises a description of a color scheme, a brightness level, a contrast level, a hue level, an amount of pixellation, or any of various combinations thereof.

12. The storage medium of claim 8 further comprising instructions for labeling the first set of data with a label indicative of whether or not the first set of metadata was recorded using speech recognition.

13. The storage medium of claim 8 further comprising instructions for labeling the first set of data with a label indicative of whether or not the first set of metadata was recorded using image recognition.

14. The storage medium of claim 8 further comprising instructions for labeling the first set of data with a label indicative of whether or not the first set of metadata was recorded using biometrics recognition.

15. A system for using metadata to detect alteration of audio data, image data, or both, the system comprising:
a metadata recording device capable of recording a first set of metadata characteristics for a first set of data representing original data, the first set of metadata characteristics including at least one respective semantic description for the first set of data; the metadata recording device capable of recording a second set of metadata characteristics for a second set of data representing data under test, the second set of metadata characteristics including at least one corresponding semantic description for the second set of data; and
a comparing mechanism, operatively coupled to the metadata recording device, for comparing the first and second sets of metadata characteristics wherein, if the first and second sets of metadata characteristics are not identical, then the second set of data is identified as an altered version of the first set of data;
wherein the comparing mechanism identifies the second set of data as an altered version of the first set of data and processes the first and second sets of metadata characteristics to identify one or more of: at least one location in the first set of data that have been altered, or at least one metadata characteristic that has changed from the first set of data to the second set of data using the at least one semantic description for the first set of data and the at least one corresponding semantic description for the second set of data; and wherein the comparing mechanism further identifies at least one metadata characteristic that has changed from the first set of data to the second set of data using the at least one semantic description for the first set of data and the at least one corresponding semantic description for the second set of data, defines a change of semantic meaning between the first set of data and the second set of data using the identified at least one metadata characteristic to determine whether or not the defined change of semantic meaning changes an overall meaning of a message defined by the first set of data and generates an alert indicative of a possible criminal intent in altering the message defined by the first set of data if the defined change of semantic meaning changes an overall meaning of a message defined by the first set of data.

16. The system of claim 15 wherein the metadata recording device is capable of recording a first set of metadata characteristics and a second set of metadata characteristics using one or more of speech recognition, image recognition, or biometrics recognition.

17. The system of claim 15 wherein the first set of data represents audio data and the semantic description for the first set of data comprises one or more of: (a) a description of a voice involved in a conversation in terms of emotion, pitch, volume, frequency, or any of various combinations thereof; or (b) a description of any background noise in terms of volume, pitch, frequency, duration, or any of various combinations thereof.

18. The system of claim 15 wherein the first set of data represents image data and the semantic description for the first set of data comprises a description of a color scheme, a brightness level, a contrast level, a hue level, an amount of pixellation, or any of various combinations thereof.

19. The system of claim 15 further comprising a labeling mechanism operatively coupled to the metadata recording device for labeling the first set of data with a label indicative of whether or not the first set of metadata was recorded using speech recognition.

20. The system of claim 15 further comprising a labeling mechanism operatively coupled to the metadata recording device for labeling the first set of data with a label indicative of whether or not the first set of metadata was recorded using image recognition.

21. The system of claim 15 further comprising a labeling mechanism operatively coupled to the metadata recording device for labeling the first set of data with a label indicative of whether or not the first set of metadata was recorded using biometrics recognition.

* * * * *